(12) United States Patent
Akolkar et al.

(10) Patent No.: US 10,192,584 B1
(45) Date of Patent: Jan. 29, 2019

(54) COGNITIVE DYNAMIC VIDEO SUMMARIZATION USING COGNITIVE ANALYSIS ENRICHED FEATURE SET

(71) Applicant: International Business Machines Corporation, Armonk, NY (US)

(72) Inventors: Rahul P. Akolkar, Austin, TX (US); Alexander M. Block, New York, NY (US); Manali J. Chanchlani, Jersey City, NJ (US); Kristi A. Farinelli, Philadelphia, PA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/657,172

(22) Filed: Jul. 23, 2017

(51) Int. Cl.
*G11B 27/031* (2006.01)
*G11B 27/10* (2006.01)
*G06K 9/00* (2006.01)
*G10L 25/57* (2013.01)

(52) U.S. Cl.
CPC ........ *G11B 27/031* (2013.01); *G06K 9/00751* (2013.01); *G10L 25/57* (2013.01); *G11B 27/10* (2013.01)

(58) Field of Classification Search
None
See application file for complete search history.

(56) References Cited

U.S. PATENT DOCUMENTS

| | | | |
|---|---|---|---|
| 6,690,725 B1 | 2/2004 | Abdeljaoud et al. | |
| 6,956,904 B2 | 10/2005 | Cabasson et al. | |
| 7,593,618 B2 | 9/2009 | Xu et al. | |
| 7,912,701 B1 | 3/2011 | Gray et al. | |
| 8,200,063 B2 | 6/2012 | Chen et al. | |
| 9,087,521 B2 | 7/2015 | Reynolds | |
| 2002/0083473 A1 | 6/2002 | Agnihotri et al. | |
| 2012/0106925 A1 | 5/2012 | Dirik et al. | |

(Continued)

OTHER PUBLICATIONS

Boreczky, John, et al., "A Hidden Markov Model Framework for Video Segmentation Using Audio and Image Features", Proc. IEEE Int'l. Conf. on Acoustics, Speech and Signal Processing, pp. 3741-3744 (1998).

(Continued)

*Primary Examiner* — Eileen M Adams
(74) *Attorney, Agent, or Firm* — Diana R. Gerhardt; Jack V. Musgrove (57) ABSTRACT

Accurate and concise summarization of a media production is achieved using cognitive analysis which groups segments of the production into clusters based on extracted features, selects a representative segment for each cluster, and combines the representative segments to form a summary. The production is separated into a video stream, a speech stream and an audio stream, from which the cognitive analysis extracts visual features, textual features, and aural features. The clustering groups segments together whose visual and textual features most closely match. Selection of the representative segments derives a score for each segment based on factors including a distance to a centroid of the cluster, an emotion level, an audio uniqueness, and a video uniqueness. Each of these factors can be weighted, and the weights can be adjusted in accordance with user input. The factors can have initial weights which are based on statistical attributes of historical media productions.

20 Claims, 5 Drawing Sheets

(56) References Cited

U.S. PATENT DOCUMENTS

| | | |
|---|---|---|
| 2012/0281969 A1 | 11/2012 | Jiang et al. |
| 2014/0219628 A1* | 8/2014 | Miner ................ H04N 5/77 386/227 |
| 2014/0226861 A1 | 8/2014 | Zhang et al. |
| 2015/0297109 A1* | 10/2015 | Garten .......... A61B 5/04845 600/544 |
| 2016/0133297 A1 | 5/2016 | Thornton et al. |
| 2016/0162575 A1* | 6/2016 | Eck ................. G06F 17/289 707/776 |
| 2016/0381111 A1* | 12/2016 | Barnett ........... H04L 65/601 709/231 |

OTHER PUBLICATIONS

Divakaran, Ajay, et al., "Video Summarization Using MPEG-7 Motion Activity and Audio Descriptors", The Springer International Series in Video Computing, v. 6, pp. 91-121 (2003).

He, Liwei, et al., "Auto-Summarization of Audio-Video Presentations", Proc. ACM Int'l. Conf. on Multimedia (Part 1), pp. 489-498 (1999).

Hong, Richang, "Dynamic Captioning: Video Accessibility Enhancement for Hearing Impairment", Proc. ACM Int'l. Conf. on Multimedia, pp. 421-430 (2010).

Microsoft,5"Cognitive Services Video API"[online], retrieved on Jun. 9, 2017 from the Internet URL: https://azure.microsoft.com/en-us/services/cognitive-services/video-api/ (2017).

\* cited by examiner

COGNITIVE DYNAMIC VIDEO SUMMARIZATION USING COGNITIVE ANALYSIS ENRICHED FEATURE SET

BACKGROUND OF THE INVENTION

Field of the Invention

The present invention generally relates to multimedia productions, i.e., "videos", and more particularly to an automated method of summarizing a long video.

Description of the Related Art

Advancements in a wide variety of technologies have led to an explosion in the production and distribution of multimedia productions. These advancements include improvements in recording technologies such as cellphone cameras which enable nearly anyone to become a producer/director, as well as enhanced distribution channels such as the Internet. One common example is the YouTube phenomenon by which ordinary users have the opportunity to view literally millions of video programs.

When someone wants to view a multimedia production on a particular topic they may find there are hundreds or even thousands of available videos on the topic. Referring again to the YouTube example, that service offers a search function by which users can enter keywords, author names, titles, etc., and retrieve a list of ostensibly related productions. The user may, however, be overwhelmed by the sheer number of videos presented. It is difficult for the user to even begin sifting through the results, and time constraints of course make it impossible for the user to actually view all of the videos that may be potentially relevant.

Several approaches have consequently been devised for summarizing videos to allow users to get a quick idea of what a video is about. The simplest of these approaches is manual summarization, i.e., a person views some or the entirety of a video and decides subjectively which pieces seem most representative. The operator then cuts out those pieces from the production and combines them to form a shortened version. Alternatively, a sort of table of contents for the production can be provided as taught in U.S. Patent Application Publication no. 20020083473. That publication describes a system for accessing a multimedia summary of a video program that displays information identifying various topics and subtopics of the video program and an entry point for each of the topics and subtopics. In response to a viewer selection of an entry point, the system displays the corresponding portion of the video program.

There are also automated techniques for video summarization. U.S. Patent no. illustrates a system for generating summarized video by identifying key frames of a video. The correspondence between feature points is used to detect shot boundaries and to select key frames. The rate of feature points, which are lost or initiated, is used as an indication if a shot transition occurred or not. Key frames are selected as frames where the activity change is low.

U.S. Pat. No. 8,200,063 discloses a system for video summarization which first extracts appearance, motion, and audio features from a video in order to create video segments corresponding to the extracted features. The video segments are classified as dynamic or static depending on the appearance-based and motion-based features extracted from each video segment, and are grouped into clusters to eliminate redundant content. Select video segments from each cluster are selected as summary segments, and the summary segments are compiled to form a summary video.

SUMMARY OF THE INVENTION

The present invention in at least one embodiment is generally directed to a method of providing a summary of a media production by receiving the media production in computer-readable form, dividing the media production into original segments having respective time stamps indicating a time order of the original segments, conducting a cognitive analysis of each of the original segments to extract at least one feature associated with each original segment, grouping the original segments into multiple clusters based on the features, selecting a representative segment for each of the clusters wherein the representative segment for a given cluster corresponds to one of the original segments within the given cluster, and combining the representative segments in time order according to their time stamps to form a media summary. The media production can be separated into a video stream and a speech stream, and the cognitive analysis can include extracting one or more visual features from the video stream selected from the group consisting of a person, an object, and a setting locale, and extracting one or more textual features from the speech stream selected from the group consisting of a keyword, an entity, a taxonomy, and a concept. The media production can be further separated into an audio stream different from the speech stream, and the selecting can include analyzing the audio stream based on audio features selected from the group consisting of amplitude and frequency. In a preferred implementation, selection of the representative segments including deriving a score for each original segment based on factors including a distance of the given segment to a centroid of its corresponding cluster, an emotion level of the given segment, an audio uniqueness of the given segment, and a video uniqueness of the given segment. Each of these factors can have an associated weight used to derive the score, and the weights can be adjusted in accordance with user input. The factors can have initial weights before any adjustment which are based on statistical attributes of historical media productions. The initial segmenting can include identifying sentences in the media production and forming a given one of the original segments from a set frames of the media production corresponding to a set of consecutive sentences, wherein each original segment has a presentation length which is greater than or equal to a predetermined threshold.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

There are still many problems with the various approaches to video summarizations. While the most accurate method is manual summarization, a human cannot adequately summarize a video without watching nearly the entire video. This requirement makes manual summarization unfeasible even for the number of videos produced in just one day, because that number is incredibly large. People wanting a preview of a video need to be shown the most salient portions in order to allow them to determine whether the entire video is worth watching. However, the naïve previewing techniques of the prior art will cause the user to miss out on key points in the production. It would, therefore, be desirable to devise an improved method of video summarization which could more accurately capture the essence of different parts of a video. It would be further advantageous if the method could achieve such improved performance regardless of domain.

These and other advantages of the invention are achieved in various embodiments by using enriched video features to create a dynamic summarization of long video input. The video is first broken up into time-ordered segments. Cognitive analysis is performed on the segments to determine optimal grouping of the segments into clusters that pertain to different aspects of the production, such as topics, speakers, setting locales, etc. The cognitive analysis serves to enrich understanding of each segment and the video as a whole. The invention can utilize different streams associated with the production such as a video stream, an audio stream, and a speech stream. A representative segment is chosen for each cluster, and those segments are stitched together in temporal order to form a shortened dynamic representation or version of the video.

Figure 1:
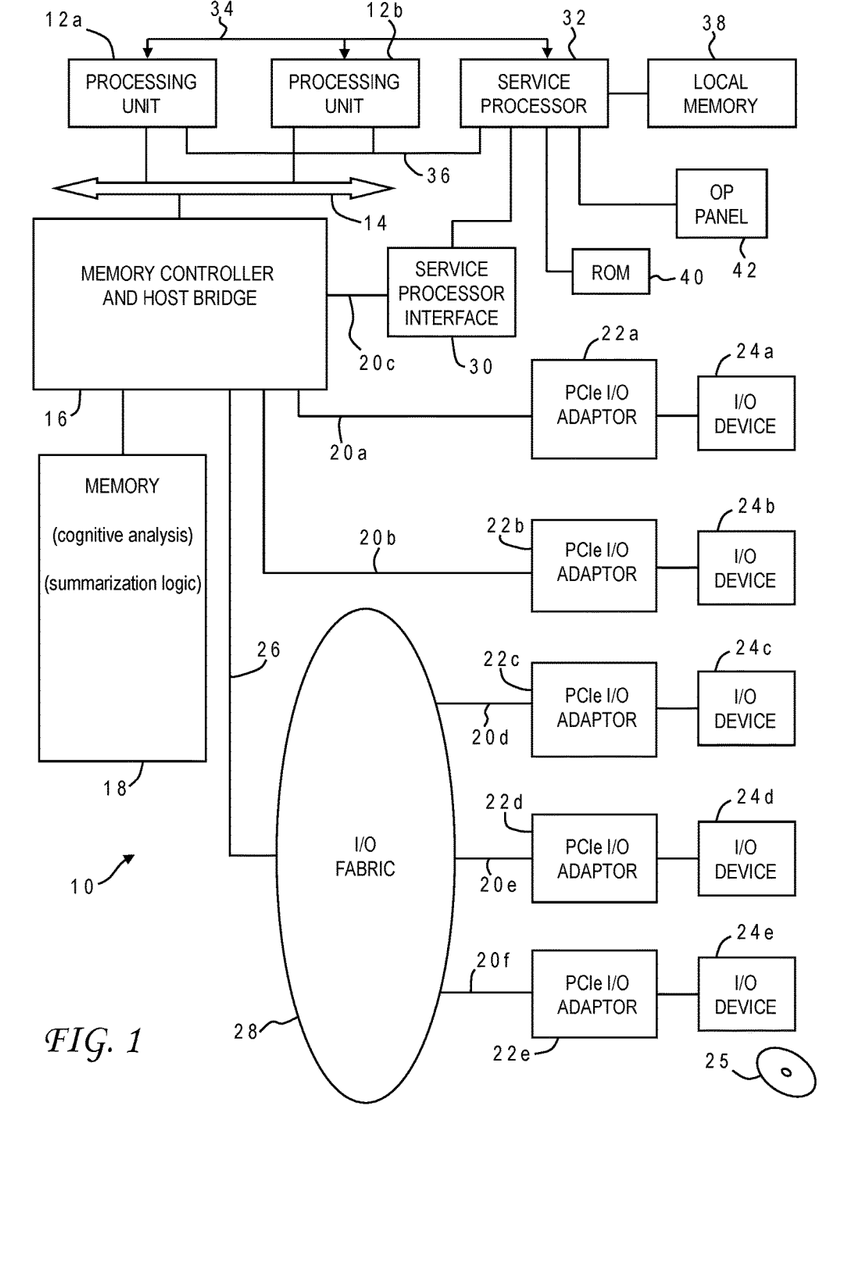
FIG. 1 is a block diagram of a computer system programmed to carry out cognitive analysis and video summarization in accordance with one implementation of the present invention.

With reference now to the figures, and in particular with reference to FIG. 1, there is depicted one embodiment 10 of a computer system in which the present invention may be implemented to carry out cognitive summarization of a multimedia production. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more applications in accordance with the present invention such as a cognitive analysis service and video summarization logic.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the video summarization program of the present invention, results of which may be stored in a hard disk drive of the system (an I/O device 24). While host processors 12*a*, 12*b* are executing program code, service processor 32 may enter a mode of monitoring and reporting any operating parameters or errors, such as the cooling fan speed and operation, thermal sensors, power supply regulators, and recoverable and non-recoverable errors reported by any of processors 12*a*, 12*b*, memory 18, and MC/HB 16. Service processor 32 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for video summarization that use novel cognitive analysis techniques to provide an enriched feature set for the video. Accordingly, a program embodying the invention may additionally include conventional aspects of various cognitive analysis tools, and these details will become apparent to those skilled in the art upon reference to this disclosure. A cognitive system (sometimes referred to as a deep learning, deep thought, or deep question answering system) is a form of artificial intelligence that uses machine learning and problem solving. Cognitive systems often employ neural networks although alternative designs exist. The neural network may be of various types. A feedforward neural network is an artificial neural network wherein connections between the units do not form a cycle. The feedforward neural network was the first and simplest type of artificial neural network devised. In this network, the information moves in only one direction, forward, from the input nodes, through the hidden nodes (if any) and to the output nodes. There are no cycles or loops in the network. As such, it is different from recurrent neural networks. A recurrent neural network is a class of artificial neural network where connections between units form a directed cycle. This creates an internal state of the network which allows it to exhibit dynamic temporal behavior. Unlike feedforward neural networks, recurrent neural networks can use their internal memory to process arbitrary sequences of inputs. A convolution neural network is a specific type of feed-forward neural network based on animal visual perception, and so is particularly useful in processing image data. Convolutional neural networks are similar to ordinary neural networks but are made up of neurons that have learnable weights and biases.

A modern implementation of artificial intelligence is the IBM Watson cognitive technology, which applies advanced natural language processing, information retrieval, knowledge representation, automated reasoning, and machine learning technologies to the field of open domain question answering. Such cognitive systems can rely on existing documents (corpora) and analyze them in various ways in order to extract answers relevant to a query, such as person, location, organization, and particular objects, or identify positive and negative sentiment. Different techniques can be used to analyze natural language, identify sources, find and generate hypotheses, find and score evidence, and merge and rank hypotheses. Models for scoring and ranking the answer can be trained on the basis of large sets of question (input) and answer (output) pairs. The more algorithms that find the same answer independently, the more likely that answer is correct, resulting in an overall score or confidence level. In particular, for the present invention, cognitive analysis can include statistical usage of the features within the multimedia production itself, e.g., some word that is repeated in speech more than any other, or used at least twice in a production.

Those skilled in the art will appreciate that the term "video" as used herein is not to be construed in a limiting sense. While the term has come to connote short films such as musical recordings (songs), instructional presentations, or promotional programs, the present invention is not so limited. The present invention can be applied to any recording of visual images (digital or analog), including full-length motion pictures, fiction or non-fiction, speeches or lectures, sporting events (to create a "highlights" clip), TV shows, collections of still photographs, compilations, etc., in any language or languages, and in general any kind of multimedia production. In this regard, even the term "multimedia" should not be considered particularly constraining as that term implies audio as well as video features, but the present invention could be applied to a production which had no audio stream per se, e.g., a video directed to a hearing-impaired individual which used sign language instead of speech, or one having no video stream, e.g., directed to a vision-impaired individual which had primarily audio content. The term "media production" is intended to cover all of these, and other, types of works. The media production also need not be complete, i.e., the production may itself be a segment of a larger production, such as a chapter of a video book, or one speaker's talk as part of a larger multi-speaker presentation.

Figure 2:
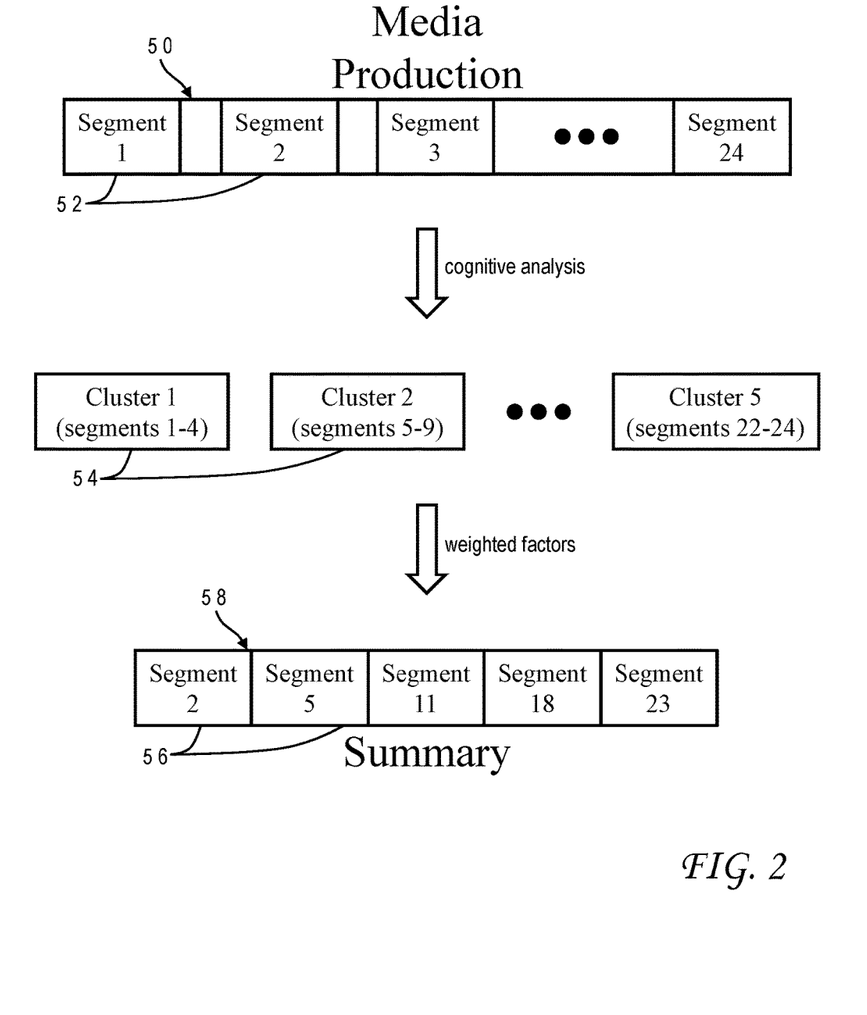
FIG. 2 is a pictorial representation of the construction of a video summary using cognitive analysis to group segments of the video into clusters and using weighted factors to select a representative segment for each cluster in accordance with one implementation of the present invention.

Referring now to FIG. 2, there is depicted an example of a video summarization for a media production 50 in accordance with one implementation of the present invention which can be carried out using computer system 10. The summarization process starts by breaking up media production 50 into a time-ordered series of segments 52. Segments 52 can be time-ordered by providing relative timestamps for each segment, e.g., representing the beginning of each segment. While the segments are in time-order, they do not necessarily have to be continuous, i.e., there could be a time gap between two consecutive segments. Different approaches can be used to providing the initial segmenting, as described further below in conjunction with FIG. 3. In this example media production 50 is broken up into twenty-four segments. Selected segments 52 are next grouped into multiple clusters 54 using cognitive analysis, as described in further detail below. The clusters are virtual only, that is, there is no need to actually create separate videos (computer files) for each cluster. In the preferred implementation a given segment can be included in only one cluster, but an alternative implementation might allow a segment (or segments) bordering (near) two clusters to be included in both clusters. In this example five clusters result from the cognitive analysis. A representative segment 56 is then chosen for each cluster, and these representative segments 56 are combined in time order to form the final summary 58. Different approaches can also be used to pick the representative segments. In the preferred implementation a representative segment is chosen based on various factors, each of which can be weighted. These factors can include a distance of a given segment to a centroid of its corresponding cluster, an emotion level of the given segment, an audio uniqueness of the given segment, and a video uniqueness of the given segment, all of which are discussed further below in conjunction with FIG. 5. In the preferred implementation only one segment is chosen as representative for a given cluster, but an alternative implementation might allow two (or more) segments to represent a cluster, e.g., if both segments have an equal score based on the noted factors. In this example final summary 58 consists of five representative segments corresponding to segments 2, 5, 11, 18 and 23.

Figure 3:
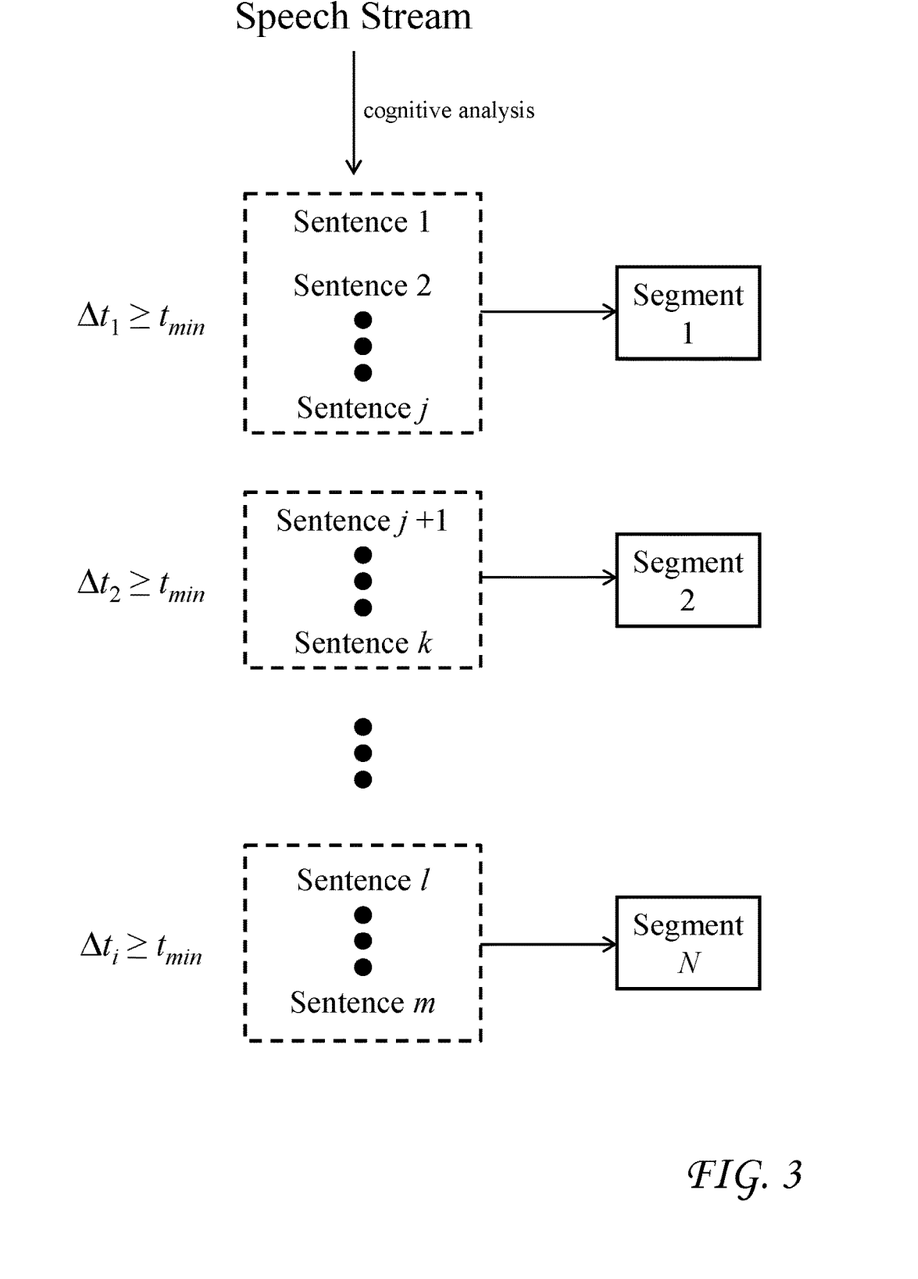
FIG. 3 is a pictorial representation of the initial segmenting of the video production by breaking down the audio stream into sentences and combine the sentences together to meet a minimum time threshold in accordance with one implementation of the present invention.

One approach for the initial segmenting operation is seen in FIG. 3. According to this implementation, the media production is analyzed to identify all sentences (full or partial). A given segment is constructed by including the portions of the production which correspond to a set of consecutive sentences. The sentences may be identified from a transcript of the production or by applying cognitive analysis (natural language processing) to a speech stream of the production, thereby creating the transcript. Sentences are combined as necessary to meet a minimum time threshold.

Thus, in the example of FIG. 3, the first segment is constructed of frames for sentences 1 through j having a presentation length (time) of $\Delta t_1$, the second segment is constructed of frames for sentences j+1 through k having a presentation length of $\Delta t_2$, and the last (Nth) segment is constructed of frames for sentences l through m having a presentation length (time) of $\Delta t_3$, wherein each of $\Delta t_1$, $\Delta t_2$ and $\Delta t_3$ are greater than or equal to the predetermined threshold $t_{min}$. The minimum time threshold may vary considerably according to designer preference; an exemplary threshold might be 15 seconds. The minimum time threshold ensures that the summarized output does not choose a segment that is extremely short. As a naive example, a simple statement or sentence such as "No." should never be chosen as a complete segment in the outputted summary.

In the illustrative embodiment the cognitive analysis conducted to perform the clustering of segments uses three different inputs from the media production, namely, a video stream, an audio stream, and a speech stream (separate from the audio stream). Features from these streams are extracted and enriched by the cognitive analysis. The video stream and audio stream can be obtained directly from the media production file using conventional playback tools. The speech stream is a timestamped transcript of the production. A user can provide the transcript, but it is preferably generated via conventional speech-to-text solutions to provide a completely automated process. The speech stream could include textual material that is displayed visually but not expressed in audible form.

Visual features that can be extracted from the video stream may include people, objects, and a setting locale. A cognitive service such as IBM's Watson Vision Recognition can give a clearer understanding of the visual input compared to more basic approaches such as analyzing color. Aural features that can be extracted from the audio stream may include amplitude and frequency (wavelength). Textual features that can be extracted from the speech stream may include keywords, entities, taxonomies, and concepts. Each of these features can have a wide range of values. Those skilled in the art will understand that these specific features are just examples and should not be construed in a limiting sense as many other visual, aural and textual features can be considered. Cognitive features can cover any pre-trained machine learning system that allows extraction from aural/visual/textual inputs. These features are inputs to the cognitive system which examines each segment to identify which of the features are present. This information is then used to establish predominant features among different candidate sets of consecutive segments and select the candidate that provides the highest confidence score, i.e., the cluster whose segments most closely match overall.

Figure 4:
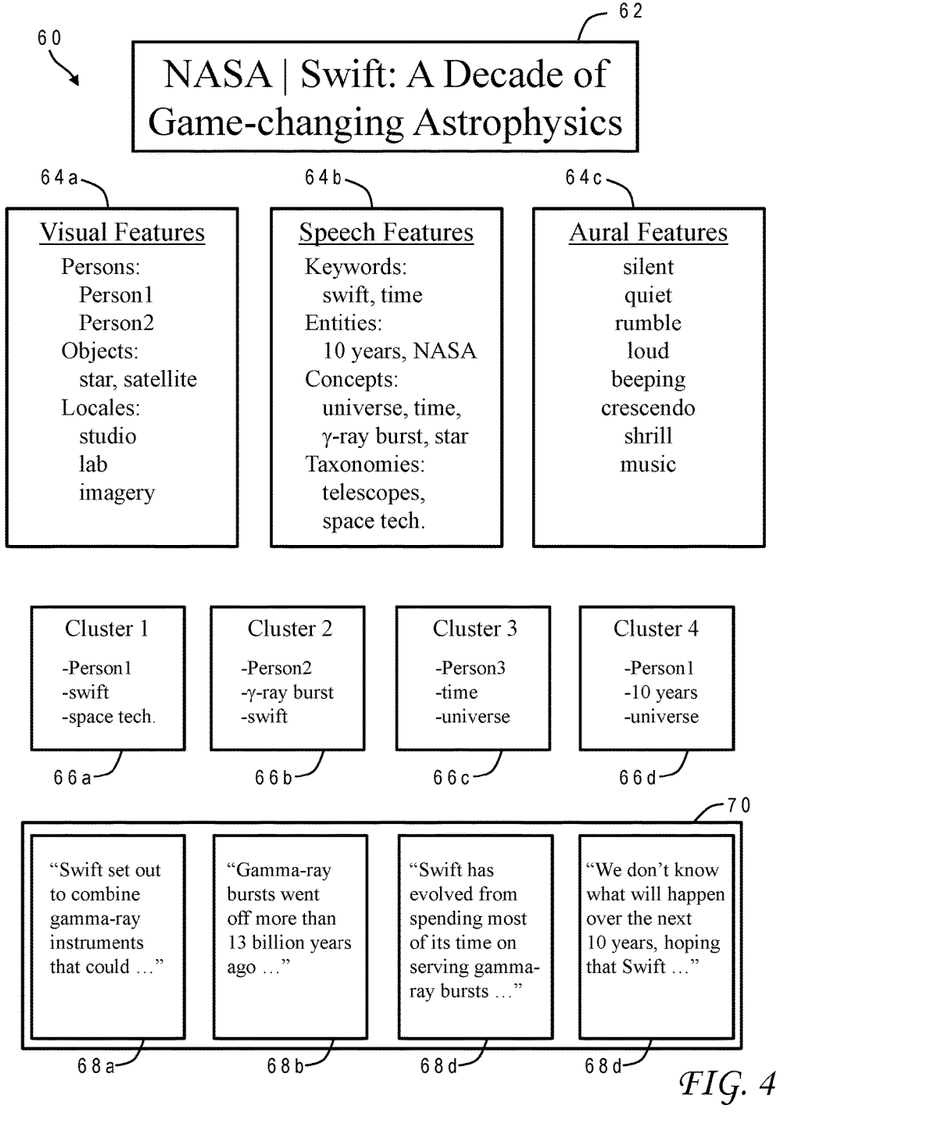
FIG. 4 is an example of a video summarization in accordance with one implementation of the present invention applied to a NASA video on a gamma-ray instrument known as SWIFT.

The present invention may be understood with reference to an example of a video summarization 60 for a specific video 62 as depicted in FIG. 4. This example uses a real-life video produced by the National Aeronautics and Space Administration (NASA) about a gamma-ray telescope known as SWIFT. This video, entitled "NASA|Swift: A Decade of Game-changing Astrophysics", is available on the Internet at URL https://svs.gsfc.nasa.gov/cgi-bin/details.cgi-?aid=10171 or https://www.youtube.com/watch?v=G84tQGQeCvk. The video explains how NASA's Swift Gamma-ray Burst Explorer has proven itself to be one of the most versatile astrophysics missions ever flown, precisely locating gamma-ray bursts as well as conducting a wide array of observations of other astrophysical phenomena.

The cognitive analysis running on computer system 10 receives the video 62 and deconstructs it into the three noted streams. From these streams for this NASA video, the cognitive system has identified visual features 64a which include persons (Person1, Person2), objects (star, satellite) and locales (studio, lab, imagery). The cognitive system has also identified speech features 64b which include keywords (swift, time), entities (10 years, NASA), concepts (universe, time, gamma-ray burst, star), and taxonomies (telescopes, space technology). The cognitive system has further identified aural features 64c which include silent, quiet, rumble, loud, beeping, crescendo, shrill and music. Note that a feature can appear in more than one stream analysis, for example, "star" might be a visual object as well as a speech keyword.

Further to this example, the cognitive clustering algorithm has created four clusters 66a, 66b, 66c, 66d for NASA video 62 (the number of clusters has been lowered for convenience in illustration). Each cluster has certain predominant features based on the segments making up the cluster, i.e., the presence of these features in one or more of the segments resulted in their inclusion in the cluster. Cluster 66a has been associated with person Person1, keyword swift and taxonomy space technology. Cluster 66b has been associated with person Person2, concept gamma-ray burst and keyword swift. Cluster 66c has been associated with person Person3, concept time and concept universe. Cluster 66d has been associated with person Person1, entity 10 years, and concept universe. Representative segments 68a, 68b, 68c, 68d have been chosen for each respective cluster 66a, 66b, 66c, 66d. Representative segment 68a represents an introduction with a quote regarding the original purpose of SWIFT (the segment with speech "Swift set out to combine gamma-ray instruments that could . . . "). Representative segment 68b represents a background explanation of gamma-ray bursts (the segment with speech "Gamma-ray bursts went off more than 13 billion years ago . . . "). Representative segment 68c represents additional information regarding SWIFT (the segment with speech "Swift has evolved from spending most of its time on serving gamma-ray bursts . . . "). Representative segment 68d represents a time frame discussion (the segment with speech "We don't know what will happen over the next 10 years, hoping that Swift . . . "). These representative segments are combined in time order to create the video summarization 70, which can be stored within computer system 10 and thereafter used in conjunction with a playback system. In this manner, this nine minute video has been condensed to less than one minute.

Figure 5:
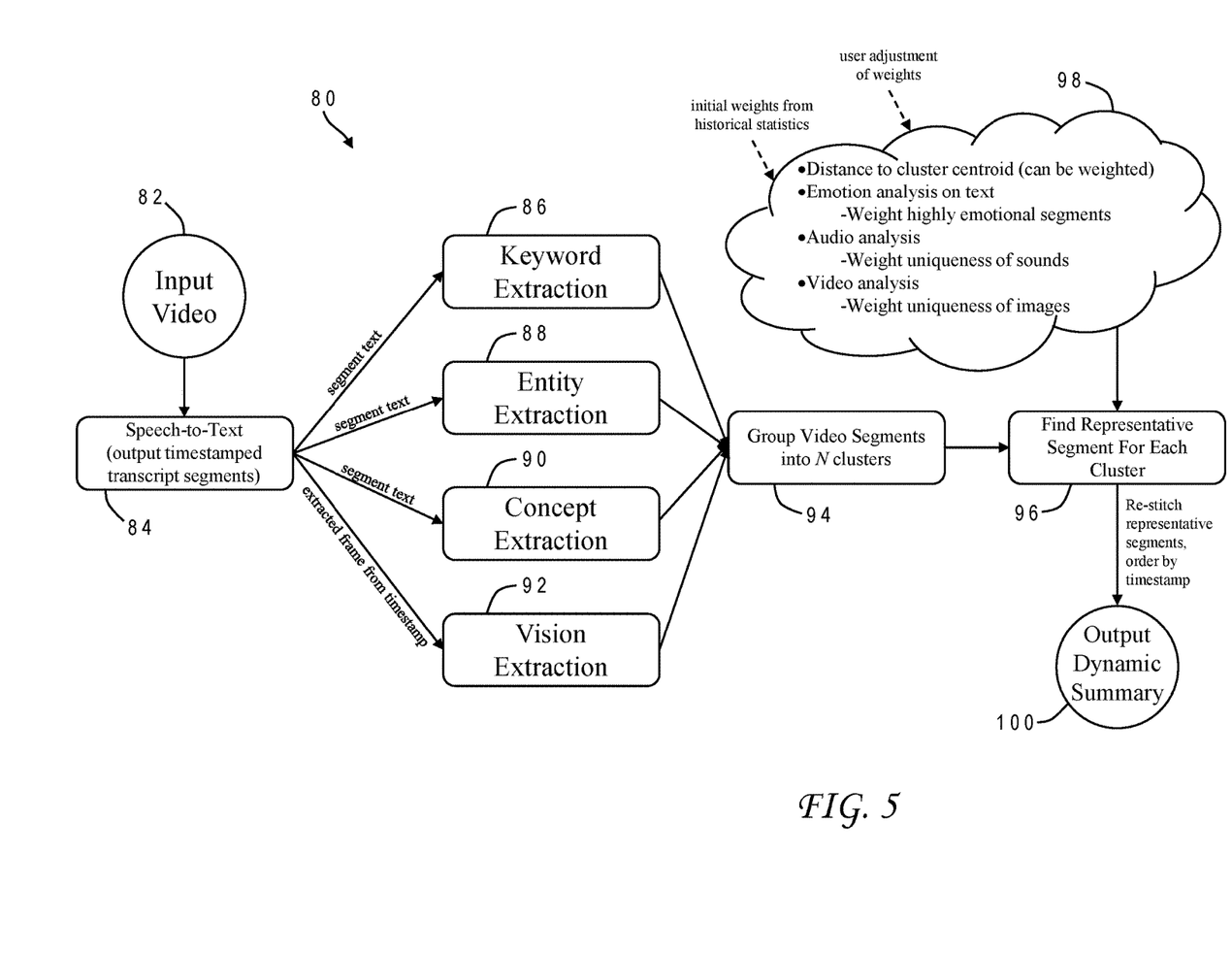
FIG. 5 is a chart illustrating the logical flow for an automated video summarization process in accordance with one implementation of the present invention.

The present invention may be further understood with reference to the chart of FIG. 5 which illustrates the logical flow for an automated video summarization process 80 in accordance with one implementation of the present invention. Process 80 begins when the computer system receives the input video 82 which undergoes speech-to-text processing 84. The resulting output is time-stamped transcript segments. Keyword extraction 86, entity extraction 88 and concept extraction 90 are performed on each segment text. Vision extraction 92 is also performed on a visual frame extracted from each segment according to the timestamp. Features from the extractions 86, 88, 90 and 92 are examined by the cognitive system to group the video segments into N clusters 94. The process then finds representative segments for each cluster 96. This selection can be based on the distance of a given segment to the cluster centroid, an emotion analysis of text in a given segment, an audio analysis to identify any unique audio characteristics in a given segment, and a video analysis to identify any unique video characteristics in a given segment. Any of these factors can be weighted in the selection process for the representative segment, and the weights can be adjusted manually by a supervisor, and initial weights can be provided based on statistical attributes of historical results from other media productions. The distance of a given segment to a cluster centroid is based on an n-dimensional vector space constructed in accordance with the various features identified in the overall media production, i.e., each feature is a dimension. Each segment has a location in this vector space based on the features it possesses. For a given cluster, the centroid is calculated by taking an average of every dimension for all of the segment vectors in the cluster. Emotion analysis can be performed using cognitive analysis as well, such as retrieval from the Natural Language Understanding application program interface (API), part of IBM's Watson Developer Cloud service. Speech text of a segment as well as tone can be input to this API which returns different emotions (joy, anger, etc.) with varying intensity. Audio and video uniqueness can be inferred from the aural and visual features previously discussed. For example, a cluster having segments that are mostly quiet but having one segment with a crescendo might score that segment higher, or a cluster that is mostly set in a studio locale might have one segment with vivid imagery that scores higher. Each segment will have a score according to these factors, and the segment with the highest score in a given cluster is selected as the representative segment for that cluster. All of the representative clusters are finally combined in time order to provide the output dynamic summary 100.

The present invention thereby overcomes the limitations of prior art summarization systems to provide a concise video summary that is more germane and cohesive. This approach provides a deep understanding of the video that is not accessible from the naïve feature sets of conventional systems. The process of the present invention will work independent of domain but remains configurable. The process also offers more flexibility; for example, the length of a summarization can easily be modified by simply changing the number of clusters. The cognitive system can allow this by providing a user interface that allows a user to force a particular number of clusters, as well as modify other parameters herein described.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of providing a summary of a media production comprising:
receiving the media production in computer-readable form, by executing first instructions in a computer system;
dividing the media production into original segments having respective time stamps indicating a time order of the original segments, by executing second instructions in the computer system;
conducting a cognitive analysis of each of the original segments to extract at least one cognitive feature associated with each original segment, by executing third instructions in the computer system;
grouping the original segments into multiple clusters based on the cognitive features by identifying one or more predominant features for each given cluster based on segments making up the given cluster, by executing fourth instructions in the computer system;
selecting a representative segment for each of the clusters based on one or more selection factors which include a distance of a given segment to a centroid of its corresponding cluster, an emotion level of the given segment, an audio uniqueness of the given segment, or a video uniqueness of the given segment wherein the representative segment for a given cluster corresponds to one of the original segments within the given cluster, by executing fifth instructions in the computer system; and
combining the representative segments in time order according to their time stamps to form a media summary, by executing sixth instructions in the computer system.

2. The method of claim 1 further comprising separating the media production into a video stream and a speech stream, wherein said conducting of the cognitive analysis includes:
extracting one or more visual features from the video stream selected from the group consisting of a person, an object, and a setting locale; and
extracting one or more textual features from the speech stream selected from the group consisting of a keyword, an entity, a taxonomy, and a concept.

3. The method of claim 2 wherein said separating further separates the media production into an audio stream different from the speech stream, and said selecting includes analyzing the audio stream based on aural features selected from the group consisting of amplitude and frequency.

4. The method of claim 3 wherein said selecting further derives a score for a given one of the original segments based on factors including a distance of the given segment to a centroid of its corresponding cluster, an emotion level of the given segment, an audio uniqueness of the given segment, and a video uniqueness of the given segment.

5. The method of claim 4 wherein each of the factors has an associated weight used to derive the score, and further comprising adjusting the weights in accordance with user input adjustments.

6. The method of claim 5 wherein the factors have initial weights before said adjusting which are based on statistical attributes of historical media productions.

7. The method of claim 1 wherein said dividing includes identifying sentences in the media production and forming a given one of the original segments from a set frames of the media production corresponding to a set of consecutive sentences, and each original segment has a presentation length which is greater than or equal to a predetermined threshold.

8. A computer system comprising:
one or more processors which process program instructions;
a memory device connected to said one or more processors; and
program instructions residing in said memory device for providing a summary of a media production by receiving the media production in computer-readable form, dividing the media production into original segments having respective time stamps indicating a time order of the original segments, conducting a cognitive analysis of each of the original segments to extract at least one cognitive feature associated with each original segment, grouping the original segments into multiple clusters based on the cognitive features by identifying one or more predominant features for each given cluster based on segments making up the given cluster, selecting a representative segment for each of the clusters based on one or more selection factors which include a distance of a given segment to a centroid of its corresponding cluster, an emotion level of the given segment, an audio uniqueness of the given segment, or a video uniqueness of the given segment wherein the representative segment for a given cluster corresponds to one of the original segments within the given cluster, and combining the representative segments in time order according to their time stamps to form a media summary.

9. The computer system of claim 8 wherein said program instructions further separate the media production into a video stream and a speech stream, and the cognitive analysis includes extracting one or more visual features from the video stream selected from the group consisting of a person, an object, and a setting locale, and extracting one or more textual features from the speech stream selected from the group consisting of a keyword, an entity, a taxonomy, and a concept.

10. The computer system of claim 9 wherein said program instructions further separate the media production into an audio stream different from the speech stream, and the selecting includes analyzing the audio stream based on aural features selected from the group consisting of amplitude and frequency.

11. The computer system of claim 10 wherein the selecting derives a score for a given one of the original segments based on factors including a distance of the given segment to a centroid of its corresponding cluster, an emotion level of the given segment, an audio uniqueness of the given segment, and a video uniqueness of the given segment.

12. The computer system of claim 11 wherein each of the factors has an associated weight used to derive the score, and further comprising adjusting the weights in accordance with user input adjustments.

13. The computer system of claim 12 wherein the factors have initial weights before the adjusting which are based on statistical attributes of historical media productions.

14. The computer system of claim 8 wherein the dividing includes identifying sentences in the media production and forming a given one of the original segments from a set frames of the media production corresponding to a set of consecutive sentences, and each original segment has a presentation length which is greater than or equal to a predetermined threshold.

15. A computer program product comprising:
a computer readable storage medium; and
program instructions residing in said storage medium for providing a summary of a media production by receiving the media production in computer-readable form, dividing the media production into original segments having respective time stamps indicating a time order of the original segments, conducting a cognitive analysis of each of the original segments to extract at least one cognitive feature associated with each original segment, grouping the original segments into multiple clusters based on the cognitive features by identifying one or more predominant features for each given cluster based on segments making up the given cluster, selecting a representative segment for each of the clusters based on one or more selection factors which include a distance of a given segment to a centroid of its corresponding cluster, an emotion level of the given segment, an audio uniqueness of the given segment, or a video uniqueness of the given segment wherein the representative segment for a given cluster corresponds to one of the original segments within the given cluster, and combining the representative segments in time order according to their time stamps to form a media summary.

16. The computer program product of claim 15 wherein said program instructions further separate the media production into a video stream and a speech stream, and the cognitive analysis includes extracting one or more visual features from the video stream selected from the group consisting of a person, an object, and a setting locale, and extracting one or more textual features from the speech stream selected from the group consisting of a keyword, an entity, a taxonomy, and a concept.

17. The computer program product of claim 16 wherein said program instructions further separate the media production into an audio stream different from the speech stream, and the selecting includes analyzing the audio stream based on aural features selected from the group consisting of amplitude and frequency.

18. The computer program product of claim 17 wherein the selecting derives a score for a given one of the original segments based on factors including a distance of the given segment to a centroid of its corresponding cluster, an emotion level of the given segment, an audio uniqueness of the given segment, and a video uniqueness of the given segment.

19. The computer program product of claim 18 wherein each of the factors has an associated weight used to derive the score, and further comprising adjusting the weights in accordance with user input adjustments.

20. The computer program product of claim 19 wherein the factors have initial weights before the adjusting which are based on statistical attributes of historical media productions.

* * * * *